United States Patent
Takahashi et al.

(10) Patent No.: US 11,501,595 B2
(45) Date of Patent: Nov. 15, 2022

(54) DISPENSING MECHANISM FOR ARTICLE VENDING MACHINE

(71) Applicant: SANDEN RETAIL SYSTEMS CORPORATION, Isesaki (JP)

(72) Inventors: Dai Takahashi, Isesaki (JP); Yugo Uehata, Isesaki (JP); Hideki Kimura, Isesaki (JP)

(73) Assignee: SANDEN RETAIL SYSTEMS CORPORATION, Gunma (JP)

( * ) Notice: Subject to any disclaimer, the term of this patent is extended or adjusted under 35 U.S.C. 154(b) by 0 days.

(21) Appl. No.: 17/292,966

(22) PCT Filed: Nov. 11, 2019

(86) PCT No.: PCT/JP2019/044079
§ 371 (c)(1),
(2) Date: May 11, 2021

(87) PCT Pub. No.: WO2020/100798
PCT Pub. Date: May 22, 2020

(65) Prior Publication Data
US 2022/0005306 A1     Jan. 6, 2022

(30) Foreign Application Priority Data
Nov. 13, 2018   (JP) .............................. JP2018-213258

(51) Int. Cl.
*G07F 11/42* (2006.01)
*G07F 11/00* (2006.01)
(Continued)

(52) U.S. Cl.
CPC .............. *G07F 11/005* (2013.01); *B65G 1/08* (2013.01); *G07F 11/10* (2013.01); *G07F 11/26* (2013.01);
(Continued)

(58) Field of Classification Search
CPC ................................ G07F 11/005; B65G 1/08
See application file for complete search history.

(56) References Cited

U.S. PATENT DOCUMENTS

| 4,108,333 | A | 9/1978 | Falk et al. |
| 4,192,436 | A | 3/1980 | Schuller et al. |
| (Continued) | | | |

FOREIGN PATENT DOCUMENTS

| CN | 203966241 | 11/2014 |
| JP | 3-91413 | 9/1991 |
| (Continued) | | |

OTHER PUBLICATIONS

Search Report dated Apr. 26, 2022 issued in European Patent Application No. 19885166.9.

*Primary Examiner* — Gene O Crawford
*Assistant Examiner* — Ayodeji T Ojofeitimi
(74) *Attorney, Agent, or Firm* — Cozen O'Connor

(57) ABSTRACT

Provided is a belt conveyor type dispensing mechanism for an article vending machine, in which an associated component other than a belt can be easily and compactly installed. The dispensing mechanism for the article vending machine includes a drive section that is disposed in an article storing shelf 13 and on which articles arranged in a front-rear direction are carried, the drive section being configured to drive based on a vending command, and a belt conveyor unit 57 that sequentially dispenses the articles forward, the belt conveyor unit 57 includes two belt conveyors 71 moving forward and arranged away from each other in a right-left direction, and a detection unit 100 of an article detection device and a gear to drive a rear rotary shaft over which belts of the belt conveyors 71 are looped are arranged between the two belt conveyors 71.

7 Claims, 10 Drawing Sheets

(51) Int. Cl.
 *B65G 1/08* (2006.01)
 *G07F 11/10* (2006.01)
 *G07F 11/26* (2006.01)
 *G07F 11/58* (2006.01)

(52) U.S. Cl.
 CPC .............. *G07F 11/42* (2013.01); *G07F 11/58* (2013.01); *B65G 2203/0233* (2013.01)

(56) References Cited

U.S. PATENT DOCUMENTS

| | | |
|---|---|---|
| 6,755,322 B1 | 6/2004 | Herzog et al. |
| 8,260,456 B2 * | 9/2012 | Siegel .................... A47F 1/126 221/92 |
| 2006/0208851 A1 * | 9/2006 | Tsunoda ................. G07F 11/58 340/572.1 |

FOREIGN PATENT DOCUMENTS

| | | |
|---|---|---|
| JP | 4-170696 | 6/1992 |
| JP | 9-124125 | 5/1997 |
| JP | 11-011632 | 1/1999 |
| JP | 11-292242 | 10/1999 |
| JP | 2013-246564 | 12/2013 |

\* cited by examiner

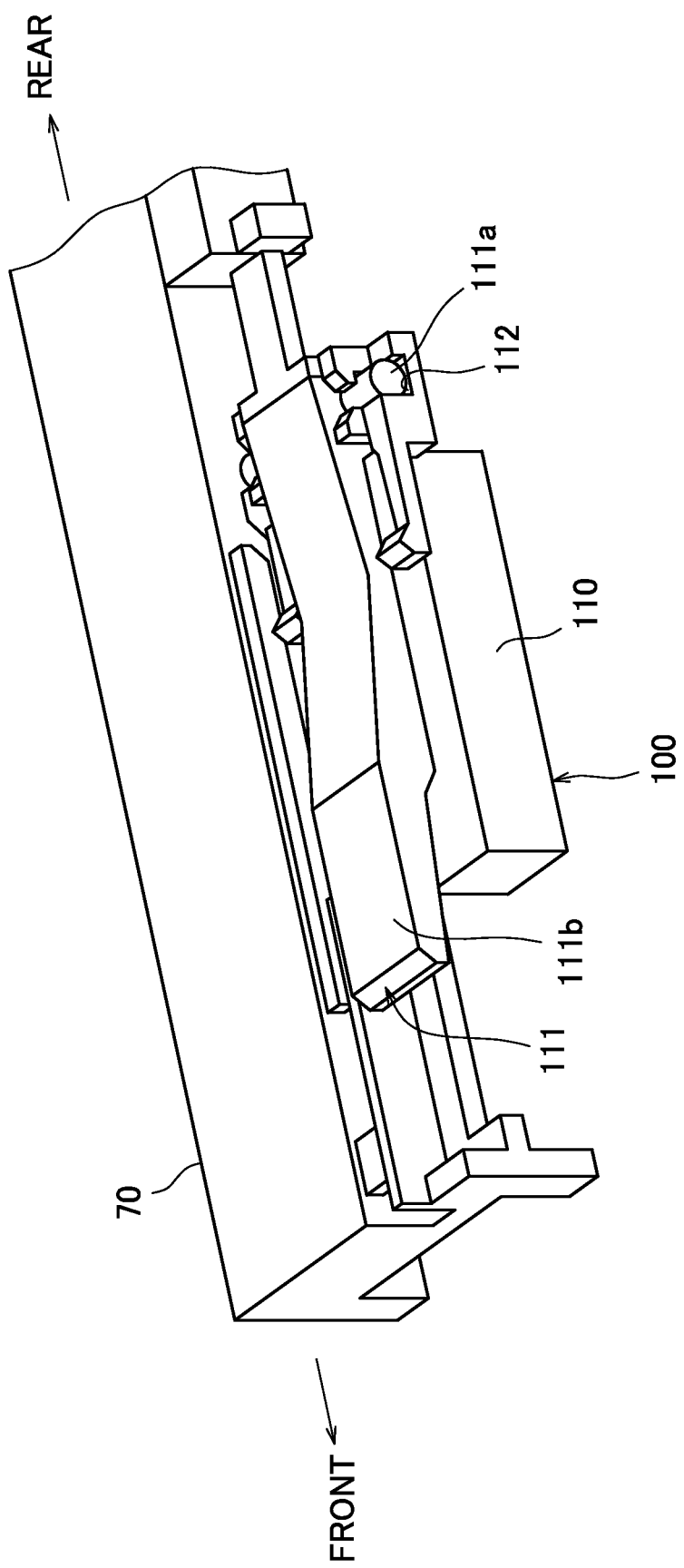

DISPENSING MECHANISM FOR ARTICLE VENDING MACHINE

RELATED APPLICATIONS

This is a U.S. National Phase Application under 35 USC 371 of International Application PCT/JP2019/044079 filed on Nov. 11, 2019.

This application claims the priority of Japanese application no. 2018-213258 filed Nov. 13, 2018, the entire content of which is hereby incorporated by reference.

TECHNICAL FIELD

The present invention relates to a dispensing mechanism that dispenses articles stored in shelves, in an article vending machine that automatically vends the articles.

BACKGROUND ART

There has been a known article vending machine that stores a plurality of types of articles on shelves provided in a box-shaped cabinet, and automatically dispenses an article selected by a purchaser. For example, an article vending machine (an automatic vending machine) described in Patent Document 1 includes a bucket (a catcher bucket) that moves in an up-down direction in front of a plurality of shelves arranged in the up-down direction in a cabinet, and a dispensing mechanism is used to push an article selected by a purchaser forward from a corresponding shelf to dispense the article into the bucket moved to front of the shelf. Then, in such a structure, the bucket carrying the article thereon is moved to a position opposed to an article outlet located in a lower part of the article vending machine, and the purchaser takes out the article from the article outlet.

In the article vending machine described in Patent Document 1, as a dispensing mechanism that dispenses the article carried on the shelf forward, a spiral dispensing mechanism including a spiral as a spiral rod-shaped part and a belt conveyor type dispensing mechanism are disclosed.

The belt conveyor type dispensing mechanism disclosed in Patent Document 1 includes a belt conveyor formed with an endless belt looped over a pair of shafts disposed in a frame and arranged away from each other in a front-rear direction, and the rear shaft is driven by a motor disposed in a rear part of the frame, to move an upper surface of the belt forward from the rear part.

Furthermore, in the belt conveyor type dispensing mechanism, articles are arranged and carried in the front-rear direction on the belt, and the belt is driven for one article, to sequentially dispense the articles forward from the belt.

PRIOR ART DOCUMENT

Patent Document

Patent Document 1: Chinese Utility Model Application No. 203966241

SUMMARY OF THE INVENTION

Problems to be Solved by the Invention

A belt conveyor type dispensing mechanism may include a sold out detection device that detects that there are no more articles on a belt. The sold out detection device includes, for example, a lever switch disposed in a vicinity of a front end portion of the belt, to be pushed by the article on the belt, and detects whether or not the articles on the belt are sold out, based on a detection result of the lever switch.

In a case where such a belt conveyor type dispensing mechanism as in Patent Document 1 includes the lever switch, however, the lever switch has to be disposed on a side of the belt so that the switch does not interfere with the belt. Depending on a shape or carried position of the article, therefore, even when the article is carried on the belt and moved forward, the lever switch cannot be pushed, and it may be difficult to correctly detect sold-out. Furthermore, when power is transmitted from an output shaft of a motor or the like to a drive shaft over which the belt is looped, the power is transmitted via a gear disposed in one end portion of the drive shaft and located on the side of the belt. Consequently, there is concern that the drive shaft driving the belt receives eccentric load, the belt and the drive shaft slip, and a dimension of the whole dispensing mechanism in a right-left direction increases.

An object of the present invention, has been made in view of such problems as described above, is to provide a belt conveyor type dispensing mechanism for an article vending machine, which is disposed in a shelf of the article vending machine, and in which an associated component other than a belt can be easily and compactly installed.

Means for Solving the Problems

In order to achieve the above object, an aspect of the present invention is directed to a dispensing mechanism for an article vending machine, including a drive section that is disposed in an article storing shelf and on which articles arranged in a front-rear direction are carried, the drive section being configured to drive based on a vending command, and a dispensing unit that is driven by the drive section to sequentially dispense the articles forward, wherein the dispensing unit includes a plurality of belt conveyors arranged in a right-left direction, arranged away from each other in the right-left direction in at least a portion, and each having an upper surface moved forward to discharge the article carried on the upper surface forward.

Preferably, the drive section may include a motor disposed in a rear part of the shelf, to drive, via a gear, a belt drive shaft over which belts of the belt conveyors are looped, and the gear may be disposed in a center between an even number of belt conveyors arranged in the right-left direction.

Preferably, a rotary drive shaft to be driven and rotated by the motor and the belt drive shaft may be arranged orthogonally to each other, the rotary drive shaft may be provided with a first bevel gear including a recess in a central portion, the dispensing mechanism may include an intermediate shaft disposed in parallel with the belt drive shaft, and including a second bevel gear that meshes with the first bevel gear, and an intermediate shaft gear that meshes with the gear disposed on the belt drive shaft, and at least a part of the intermediate shaft gear may be located in the recess of the first bevel gear.

Preferably, the dispensing mechanism may include a detecting section that detects presence/absence of the article carried on the belt conveyor, between the belt conveyors in the right-left direction.

Preferably, the detecting section may be disposed in a center between an even number of belt conveyors arranged in the right-left direction.

Preferably, the dispensing unit may be removably fixed to the shelf, and may include a connecting section removably disposed between a region of the rotary drive shaft that is supported in the shelf and the first bevel gear.

Advantageous Effects of the Invention

According to the present invention, a dispensing unit disposed in a shelf to sequentially dispense carried articles forward includes a plurality of belt conveyors arranged in a right-left direction, and hence, right and left lower portions of each of the articles carried on the belt conveyors are supported, and the plurality of belt conveyors are driven, so that properties of dispensing the articles forward can improve.

Furthermore, the plurality of belt conveyors are arranged away from each other in the right-left direction in at least a portion, and hence, associated components such as an article detection device and a drive gear can be arranged between the belt conveyors arranged away from each other. Therefore, these associated components are arranged at positions close to center of gravity of the article in the right-left direction. Functionalities of the associated components can improve, and the dispensing mechanism including the associated components can be compactly formed.

BRIEF DESCRIPTION OF THE DRAWINGS

FIG. 9B is a perspective view showing a structure of the detection unit in a case where the article is large.

MODE FOR CARRYING OUT THE INVENTION

Hereinafter, description will be made in detail as to an embodiment of the present invention with reference to the drawings.

Figure 1:
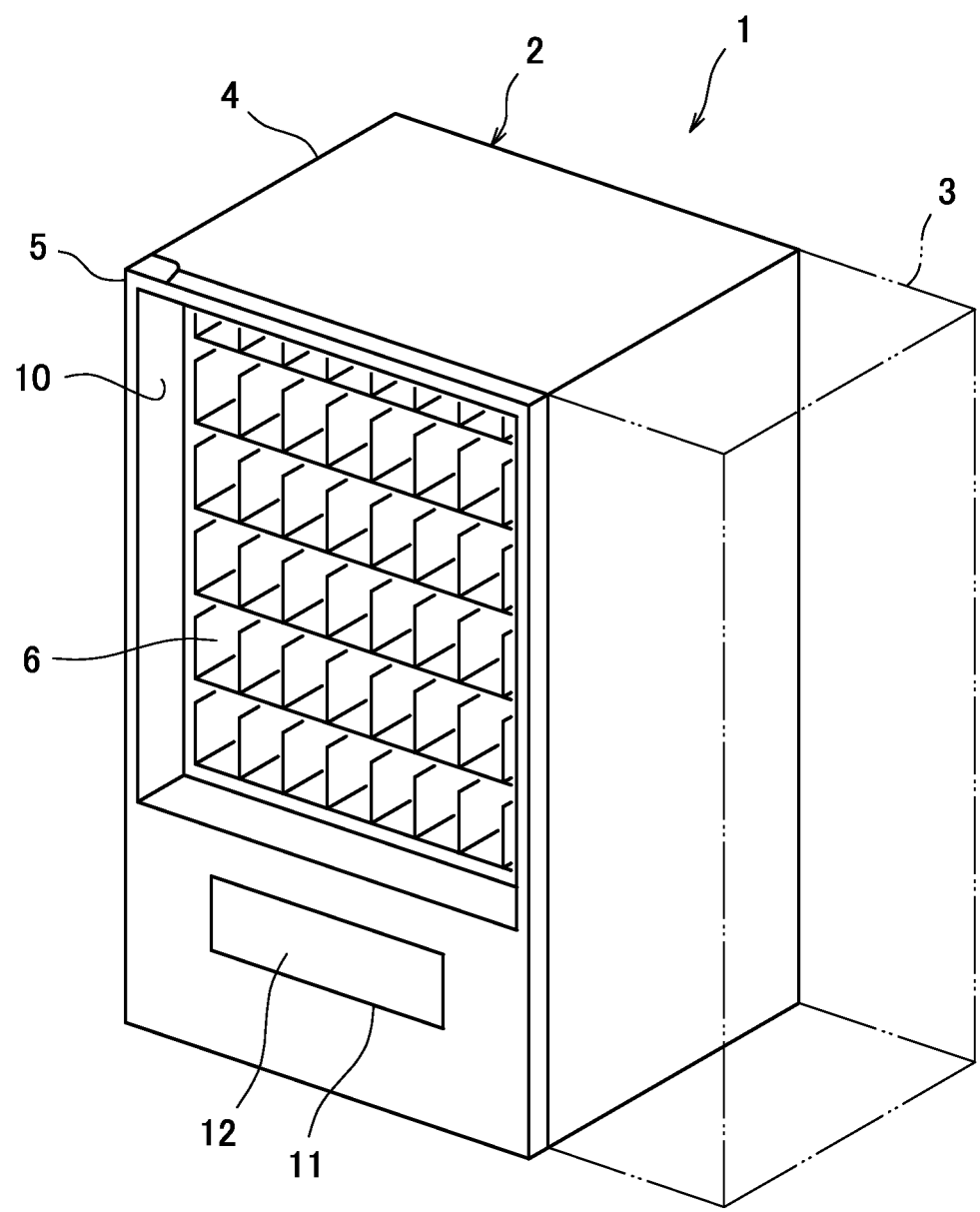
FIG. 1 is a perspective view showing a schematic exterior shape of an article vending machine of an embodiment of the present invention.
Figure 2:
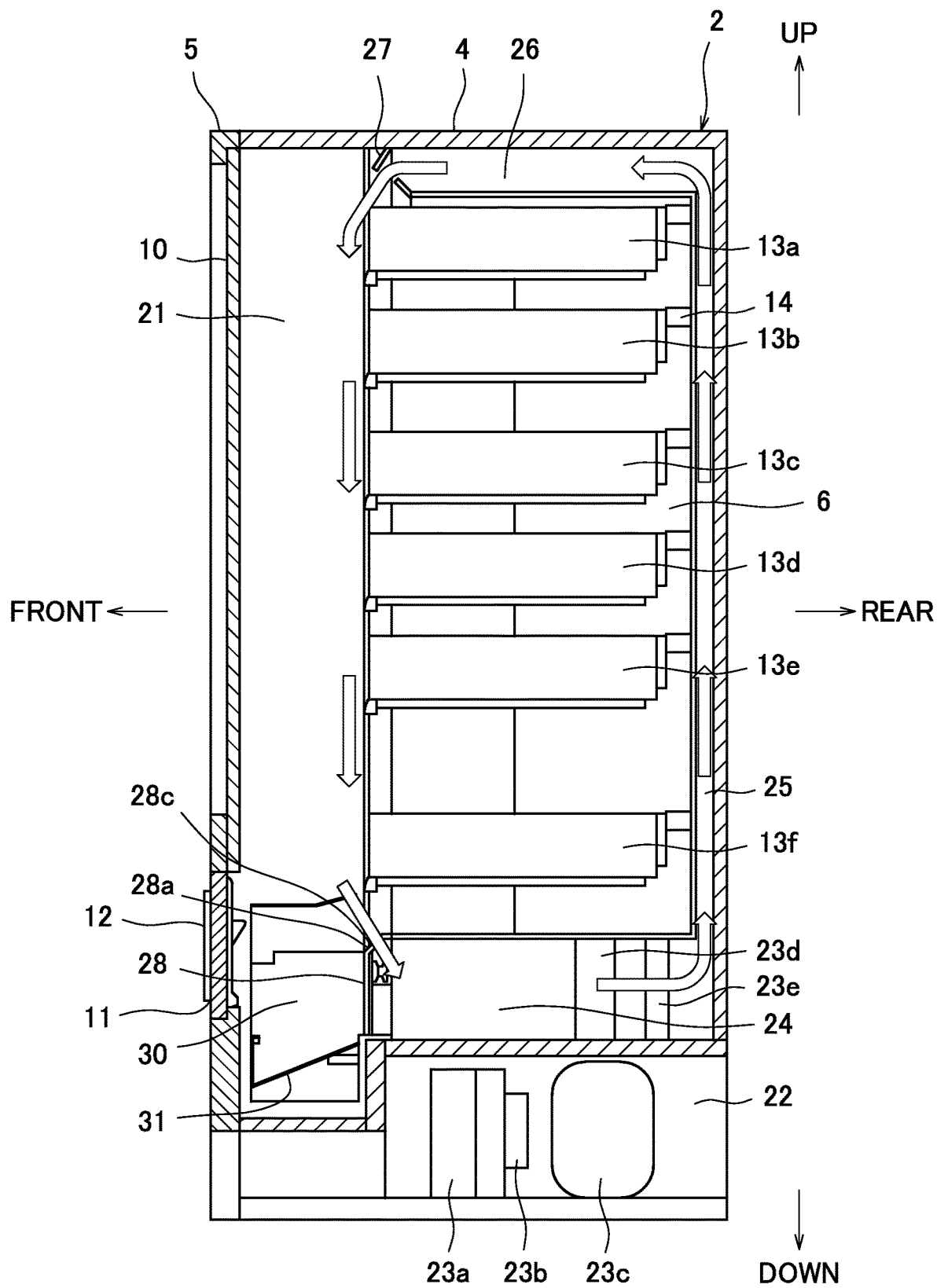
FIG. 2 is a vertical cross-sectional view showing an interior structure of the article vending machine of the present embodiment.

FIG. 1 is a perspective view showing a schematic exterior shape of an article vending machine of the present embodiment. FIG. 2 is a vertical cross-sectional view showing an interior structure of the article vending machine.

As shown in FIG. 1, an article vending machine 1 includes a main body unit 2 that stores articles, and an operation unit 3.

The main body unit 2 includes a box-shaped cabinet 4 formed in a box shape having an opened front surface, and including a door 5 that openably/closably covers a front surface opening. Furthermore, an article storage section 6 that stores the articles is provided inside the cabinet 4.

The operation unit 3 is disposed adjacent to a side of the main body unit 2, and includes a selecting switch of an article, and a billing section that performs acceptance or payment of charges by bills, coins or the like, or payment by card. The operation unit 3 transmits a vending command to the main body unit 2 in response to the payment of the charges performed in the billing section and a selecting operation of the article performed with the selecting switch.

As shown in FIGS. 1 and 2, an upper part of a front surface of the door 5 of the main body unit 2 is configured such that the interior can be viewed through a transparent plate 10 made of transparent glass or resin. In a lower part of the door 5, a rectangular article outlet 11 (an outlet) is provided. In the article outlet 11, a rectangular plate-like outlet shutter 12 is provided. The outlet shutter 12 is supported swingably in a front-rear direction in an upper edge portion of the article outlet 11. The outlet shutter 12 closes the article outlet 11 at a closing position extending in an up-down direction, and has a lower part swung rearward from this closing position, to open the article outlet 11.

The article storage section 6 in the cabinet 4 is configured such that a plurality of (e.g., six) shelves 13a to 13f each having an opened front part are arranged at a distance in the up-down direction. The shelf 13f of a bottom row in the article storage section 6 stores articles that are comparatively large in the up-down direction, such as PET bottle beverages, and the shelf 13a in a top row stores articles that are comparatively small in the up-down direction.

A space where a bucket 30 moves (hereinafter, referred to also as a bucket moving space 21) is provided in the front-rear direction between a front end portion of each of the shelves 13a to 13f and the transparent plate 10 that is the front surface of the door 5.

The bucket 30 is formed with about the same length as in each of the shelves 13a to 13f in a right-left direction, and configured to be movable in the bucket moving space 21 in the up-down direction. The bucket 30 is moved in the up-down direction by an unshown actuator provided inside the cabinet 4, and a rear end portion of a bottom plate 31 of the bucket 30 is movable to upper and lower positions of a bottom plate of each of the shelves 13a to 13f. The bucket is movable so that the rear end portion of the bottom plate is located below a lower surface of the shelf 13f of the bottom row when the bucket is moved to a bottom. Note that a position of the bucket 30 moved to the bottom is a standby/outlet position. At this standby/outlet position, the article outlet 11 is located at a front surface of the bucket 30, and one can open the outlet shutter 12 and put one's hand into the bucket 30.

Inside the main body unit 2, a machine room 22 is disposed below the article storage section 6. In the machine room 22, a condenser 23a of cooling equipment by refrigeration cycle, a fan 23b for the condenser and a compressor 23c are provided. A front part and a rear pat of the machine room 22 communicate with an exterior. Furthermore, a lower duct 24 is disposed between the machine room 22 and the shelf 13f of the bottom row. The lower duct 24 is provided with an evaporator 23d for the cooling equipment and a fan 23e for the evaporator 23d. The fan 23e generates flow of air passing through the evaporator 23d from front to rear of the lower duct 24.

A rear part of the lower duct 24 communicates with a rear duct 25 extending in the up-down direction behind the article storage section 6. Furthermore, an upper duct 26 extending in the front-rear direction is disposed above the article storage section 6.

A front opening of the upper duct 26 opens toward an upper part of the bucket moving space 21. Additionally, a wind guide plate 27 inclined downward and forward at an angle of, for example, 45 degrees is disposed in an upper edge portion of the front opening of the upper duct.

On the other hand, a back panel 28 is disposed in a front end portion of the lower duct 24. The back panel 28 extends in the up-down direction, and defines the bucket moving space 21 in front of the lower duct 24 together with the duct. Furthermore, in an inclined part 28a that is an upper part of the back panel 28, a plurality of vents 28c each having a diameter of about several millimeters are arranged at a distance of about 1 cm in up-down and right-left directions.

When each component of the cooling equipment is operated, particularly when the fan 23e in the lower duct 24 is operated, as shown by arrows in FIG. 2, cooling air passing through and cooled by the evaporator 23d circulates from the lower duct 24 through the rear duct 25, the upper duct 26, and the bucket moving space 21 to the lower duct 24 in order. Note that part of the cooling air from the rear duct 25 moves forward among the shelves 13a to 13f, to cool the articles C stored in the shelves 13a to 13f.

During the movement of the cooling air from the upper duct 26 to the bucket moving space 21, the cooling air is moved downward in a rear part of the bucket moving space 21 via the wind guide plate 27, and the cooling air moves through the vents 28c of the back panel 28 to the lower duct 24. Therefore, the cooling air forms air curtain along front surfaces of the shelves 13a to 13f. Consequently, the cooling air can be inhibited from being in contact with the transparent plate 10 of the door 5, and the transparent plate 10 of the door 5 can be inhibited from fogging up.

Figure 3:
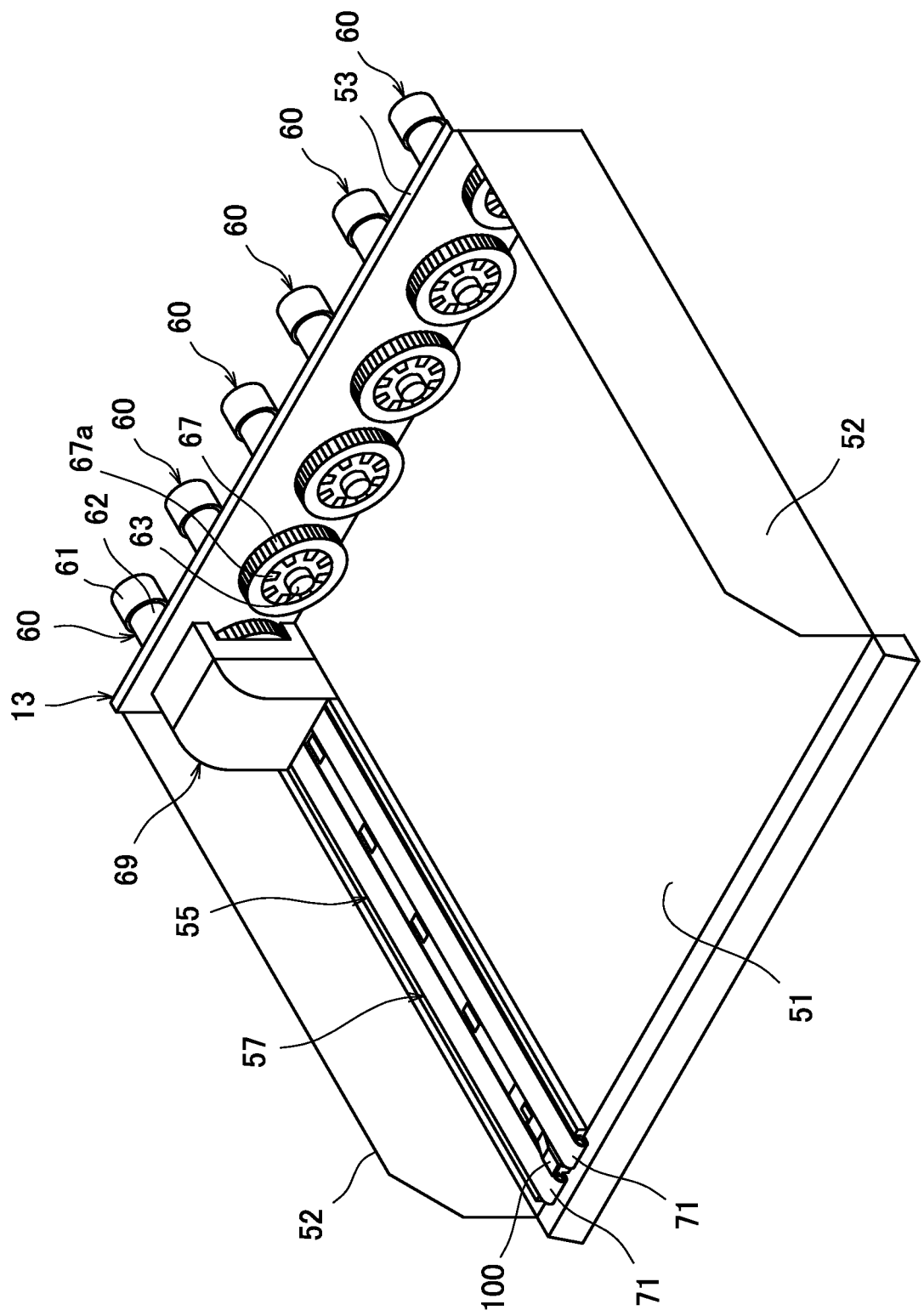
FIG. 3 is a perspective view showing a structure of a shelf of an article storage section.

FIG. 3 is a perspective view showing a structure of a shelf 13 of the article storage section 6.

As shown in FIG. 3, each of the shelves 13 (13a to 13f) is formed in a box shape including a bottom plate 51, right and left side plates 52 and a back plate 53, and opened upward and forward. Moreover, the shelf 13 includes the dispensing mechanism 55 and an unshown partition plate.

The dispensing mechanism 55 is constituted of a belt conveyor unit 57 (a dispensing unit) disposed on the bottom plate 51 of the shelf 13, and a drive section 60 fixed to the back plate 53 of the shelf 13. The belt conveyor unit 57 has about the same length as a length of the bottom plate 51 in a front-rear direction, and is disposed between the unshown partition plates or between the partition plate and the side plate 52.

A plurality of partition plates each extending in the front-rear direction are arranged at a distance from each other in a right-left direction between the right and left side plates 52. The partition plate is removably fixed to the bottom plate 51 and the back plate 53 of the shelf.

The drive section 60 includes a motor 61, a transmission section 62, and a gear shaft 63 (a rotary drive shaft).

The transmission section 62 contains a transmission gear, and is disposed on a rear surface side of the back plate 53 of the shelf 13. The motor 61 is fixed to a rear surface side of an upper part of the transmission section 62. A rear part of the gear shaft 63 extending in the front-rear direction is inserted into and rotatably supported by a lower part of the transmission section 62. The gear shaft 63 is formed by fixing a disk-shaped gear 67 to a front end portion of a columnar shaft. A front end portion of the gear shaft 63 protrudes forward from the back plate 53, and the gear 67 is disposed close to and on a front surface side of the back plate 53.

In a front surface of the gear 67, a connecting section 67a is disposed to which an input shaft of the belt conveyor unit 57 is removably connected. The belt conveyor unit 57 is carried at the same position as a position of an axis of the gear shaft 63 in the right-left direction on the bottom plate 51 of the shelf 13, has a front end portion removably fixed to a front end portion of the bottom plate 51, and has a rear end portion removably fixed to the back plate 53.

Figure 4:
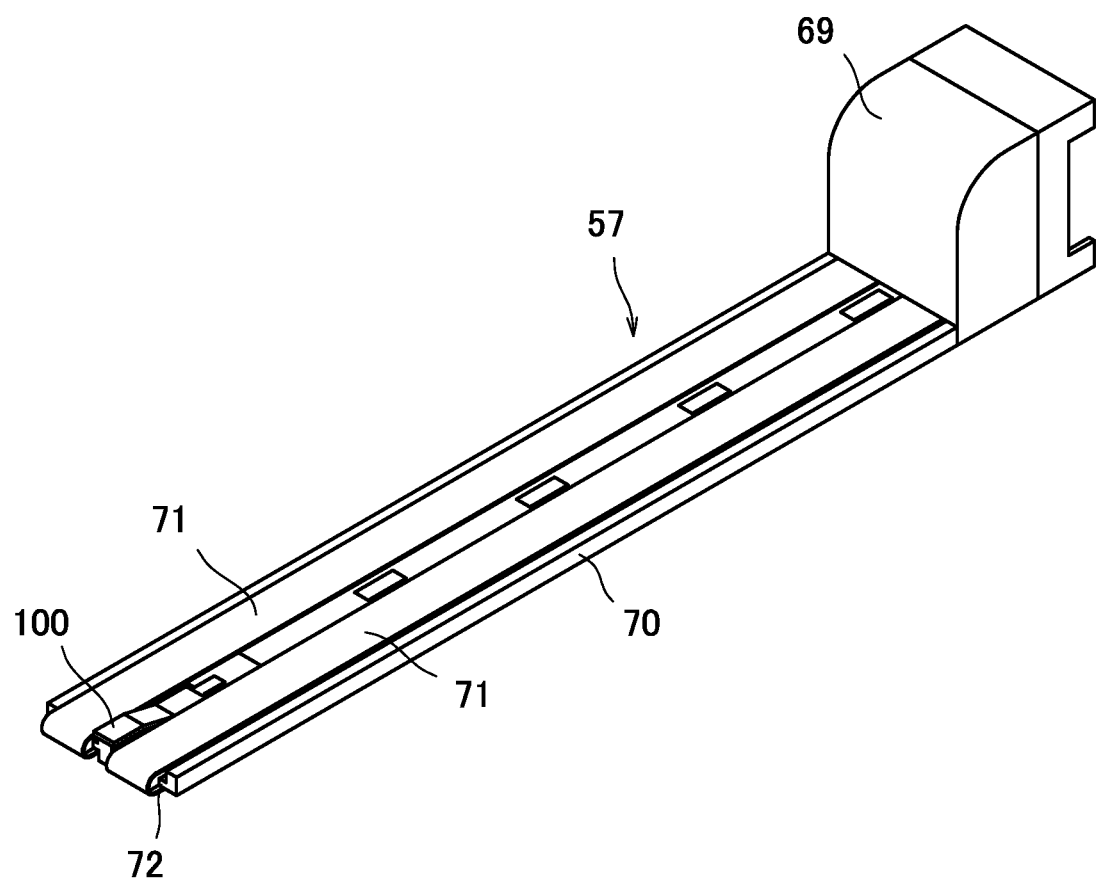
FIG. 4 is a perspective view showing a structure of a belt conveyor unit.
Figure 5:
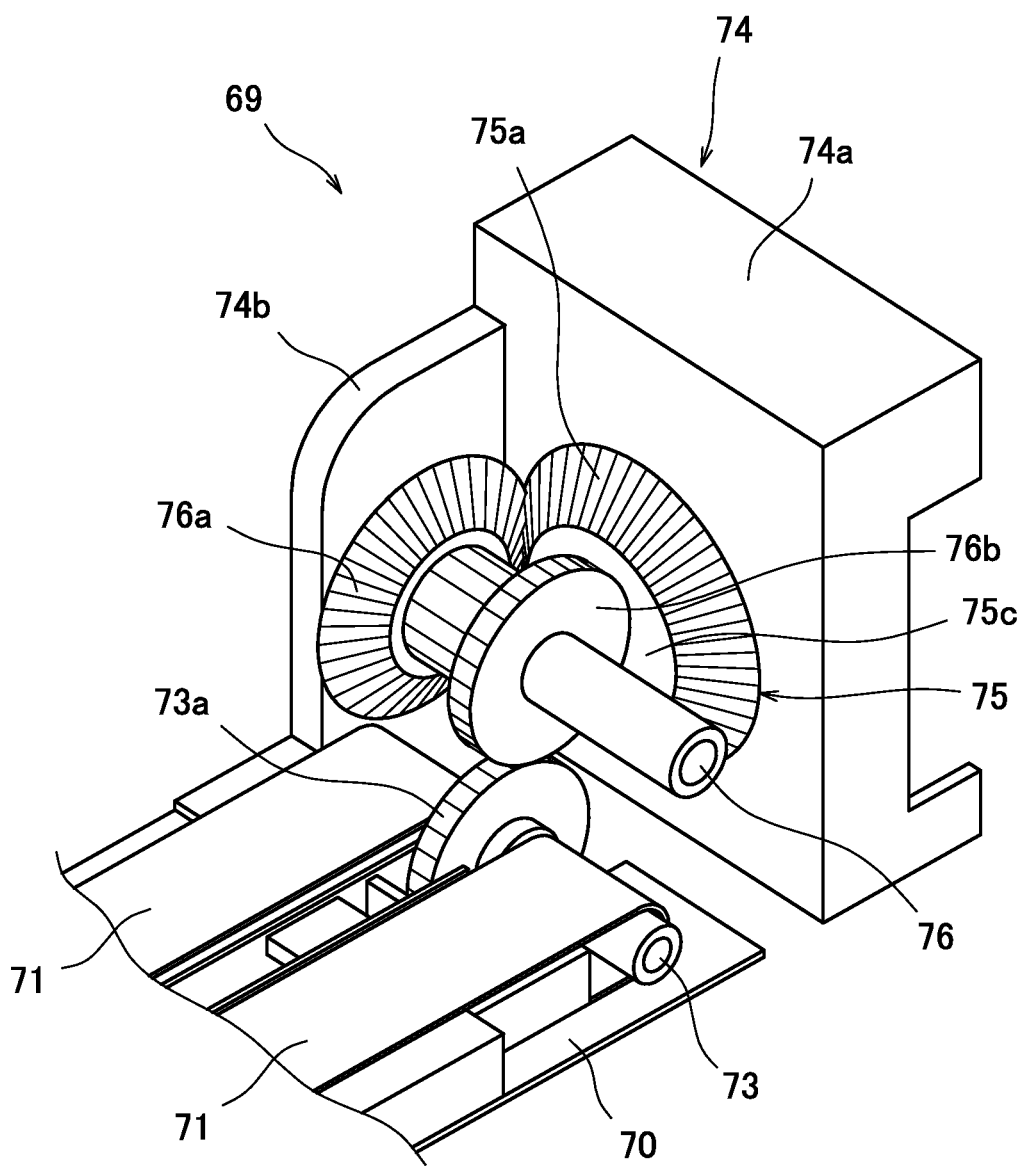
FIG. 5 is a front perspective view showing an interior structure of a gear section of the belt conveyor unit.
Figure 6:
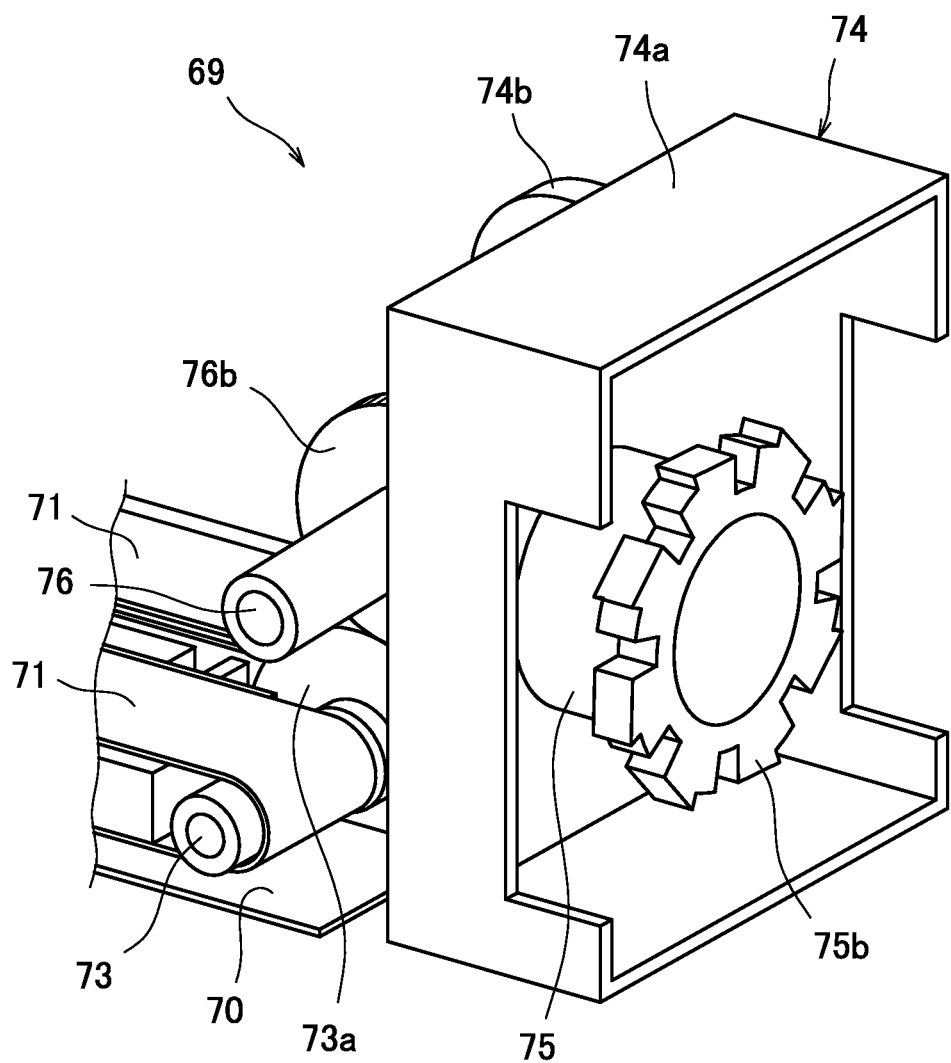
FIG. 6 is a rear perspective view showing the interior structure of the gear section of the belt conveyor unit.
Figure 7:
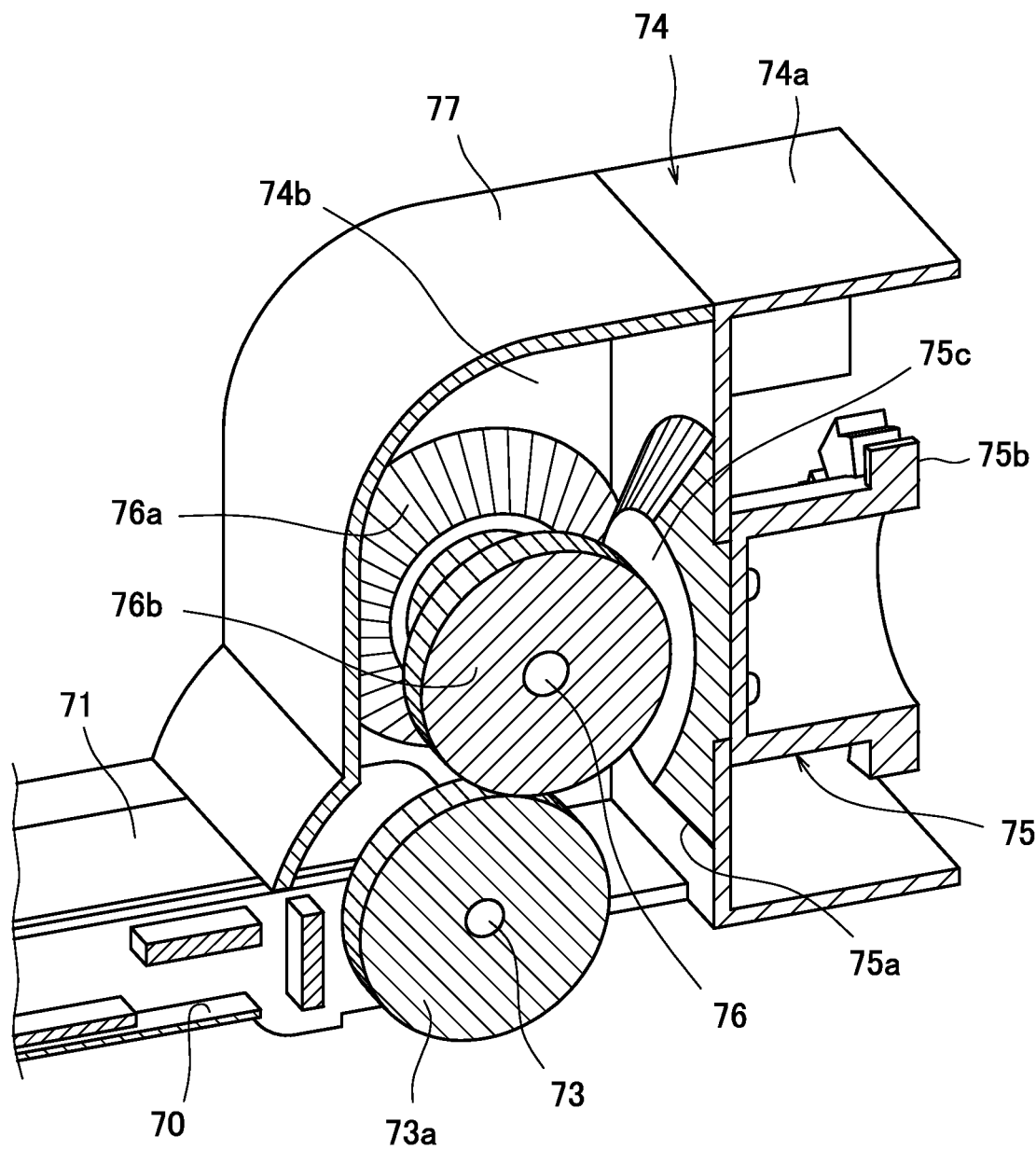
FIG. 7 is a vertical cross-sectional view showing the internal structure of the gear section of the belt conveyor unit.

FIG. 4 is a perspective view showing a structure of the belt conveyor unit 57. FIG. 5 is a front perspective view showing an interior structure of a gear section 69 of the belt conveyor unit 57. FIG. 6 is a rear perspective view showing the interior structure of the gear section 69 of the belt conveyor unit 57. FIG. 7 is a vertical cross-sectional view showing the internal structure of the gear section 69 of the belt conveyor unit 57. Note that in FIGS. 5, 6, a cover 77 and one of right and left vertical plates 74b are omitted.

As shown in FIGS. 4, 5, the belt conveyor unit 57 includes a support member 70 formed to extend in the front-rear direction of the shelf 13, a pair of belt conveyors 71 provided in parallel with each other in the support member 70, and the gear section 69 disposed in a rear end portion of the support member 70.

The support member 70 is a member having a length that is several centimeters shorter than a length of the bottom plate 51 in the front-rear direction, and having a length of, for example, several centimeters in the right-left direction.

In a front end portion of the support member 70, a front rotary shaft 72 extending in the right-left direction is rotatably supported. In the rear end portion of the support member 70, a rear rotary shaft 73 (a belt drive shaft) extending in the right-left direction is rotatably supported in parallel with the front rotary shaft 72 and at about the same position as a position of the front rotary shaft in the up-down direction.

The pair of belt conveyors 71 are endless belts disposed around at a distance of a predetermined distance (e.g., about 10 mm) in the right-left direction in parallel with each other between the front rotary shaft 72 and the rear rotary shaft 73, and having the same width in the right-left direction.

As shown in FIGS. 5 to 7, the gear section 69 includes a gear support member 74 fixed to the rear end portion of the support member 70, a first gear shaft 75 (a rotary drive shaft), a second gear shaft 76 (an intermediate shaft), and the cover 77.

The gear support member 74 includes a box member 74a formed in a rectangular box shape having a rear part opened, and a pair of vertical plates 74b extending in the up-down direction, arranged at a distance from each other in the right-left direction, and connecting right and left end portions of a front surface of the box member 74a and right and left rear end portions of the support member 70, respectively.

The first gear shaft 75 is rotatably supported in a hole disposed in a central portion of a front wall of the box member 74a, and disposed to extend in the front-rear direction. A first bevel gear 75a is fixed to a front side of a front wall of the first gear shaft 75, and a connecting section 75b is disposed on a rear side of the front wall of the box member 74a. The connecting section 75b is inserted and connected from front into the connecting section 67a of the gear 67 of the drive section 60, to transmit rotation between the gear shaft 63 of the drive section 60 and the first gear shaft 75. The first bevel gear 75a has a front surface recessed rearward to form a recess 75c.

The second gear shaft 76 is rotatably supported in holes provided in the pair of vertical plates 74b, and formed to extend in the right-left direction, i.e., orthogonally to the first gear shaft 75. The second gear shaft 76 is disposed at about the same position as a position of the first gear shaft 75 in the up-down direction and at a distance in front of the first gear shaft, and disposed in parallel with the rear rotary shaft 73.

A second bevel gear 76*a* that meshes with the first bevel gear 75*a* of the first gear shaft 75 is fixed to a vicinity of an end portion of the second gear shaft 76 in the right-left direction. A spur gear 76*b* (an intermediate shaft gear) is fixed to a central portion of the second gear shaft 76 in the right-left direction.

Furthermore, a spur gear 73*a* (a gear) that meshes with the spur gear 76*b* of the second gear shaft 76 is fixed to a central portion of the rear rotary shaft 73 in the right-left direction between two belt conveyors 71.

Therefore, the belt conveyor unit 57 is installed on the bottom plate 51, and the connecting section 75*b* is connected to the gear 67 of the drive section 60, to drive the motor 61 of the drive section 60. Consequently, the rear rotary shaft 73 rotates via the first gear shaft 75 and the second gear shaft 76, and the belt conveyor 71 is driven to rotate. Thus, the articles carried on the belt conveyor 71 can be moved forward and dispensed forward.

The cover 77 is disposed to cover a space between the right and left vertical plates 74*b*, and to cover the first gear shaft 75 (a rotary shaft), the second gear shaft 76 and the spur gear 73*a* of the rear rotary shaft 73, and the cover is fastened to the rear end portion of the support member 70 with screws or the like.

Figure 8:
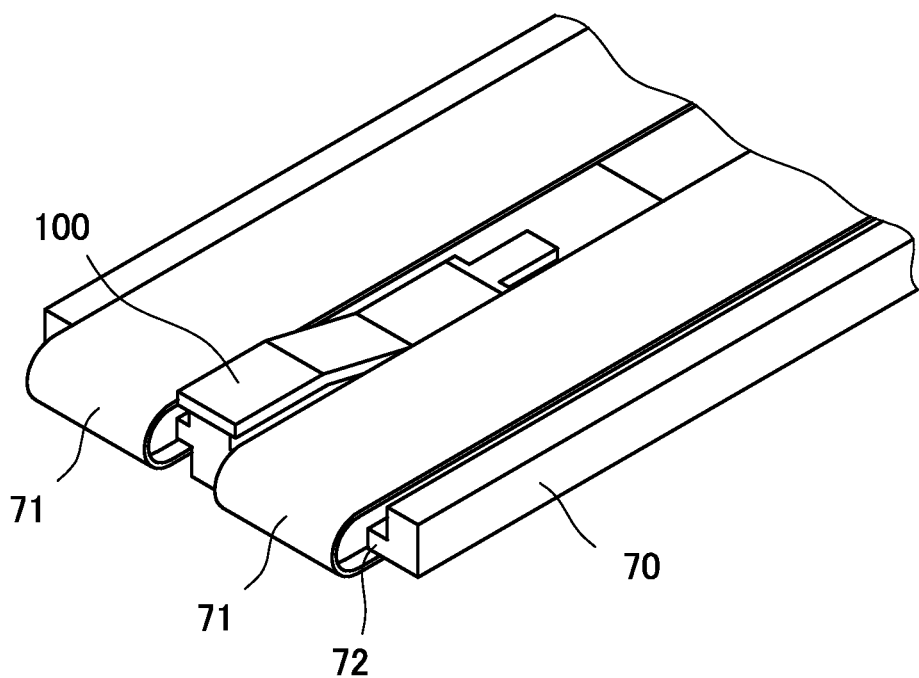
FIG. 8 is a perspective view showing a structure of a front end portion of the belt conveyor unit.

FIG. 8 is a perspective view showing a structure of a front end portion of the belt conveyor unit 57. FIG. 9 is a perspective view showing a structure of a detection unit 100 (a detecting section), (A) shows a case where the article is small, and (B) shows a case where the article is large.

As shown in FIG. 8, the detection unit 100 of an article detection device is disposed in the front end portion of the belt conveyor unit 57.

The article detection device is a device that detects presence/absence of the article in each dispensing mechanism 55 of each shelf 13, and the device detects the presence/absence of the article in front of a row of articles arranged in the front-rear direction and carried in each dispensing mechanism 55, to detect passage of the article. Note that detection information obtained by this article detection device is for use in, for example, determining whether the articles in the corresponding dispensing mechanism 55 are sold out.

As shown in FIG. 9, the detection unit 100 includes a support member 110 and a detection lever 111 (a lever section).

The detection lever 111 includes a claw plate-shaped detecting portion 111*b* extending in the front-rear direction, and a shaft portion 111*a* extending in the right-left direction in a rear end portion of the detecting portion 111*b*.

The support member 110 extends in the front-rear direction, and includes, in a rear part, a lever support hole 112 in which the shaft portion 111*a* of the detection lever 111 is rotatably supported.

Under the detection lever 111, provided are an unshown urging member that urges the detecting portion 111*b* of the detection lever 111 upward to the support member 110, and an unshown microswitch that detects downward rotation of the detecting portion 111*b* of the detection lever 111.

Then, in a case where the article is carried on the detection lever 111, a front end of the detection lever 111 rotates downward to the same position as a position of an upper surface of the support member 70 in the up-down direction against urging by the urging member. At this time, the microswitch of the detection unit 100 turns on.

Furthermore, in a case where any articles are not carried on the detection lever 111, a rear end of the detection lever 111 is urged by the urging member, to protrude upward from the upper surface of the support member 70. At this time, the microswitch of the detection unit 100 turns off.

Figure 9A:
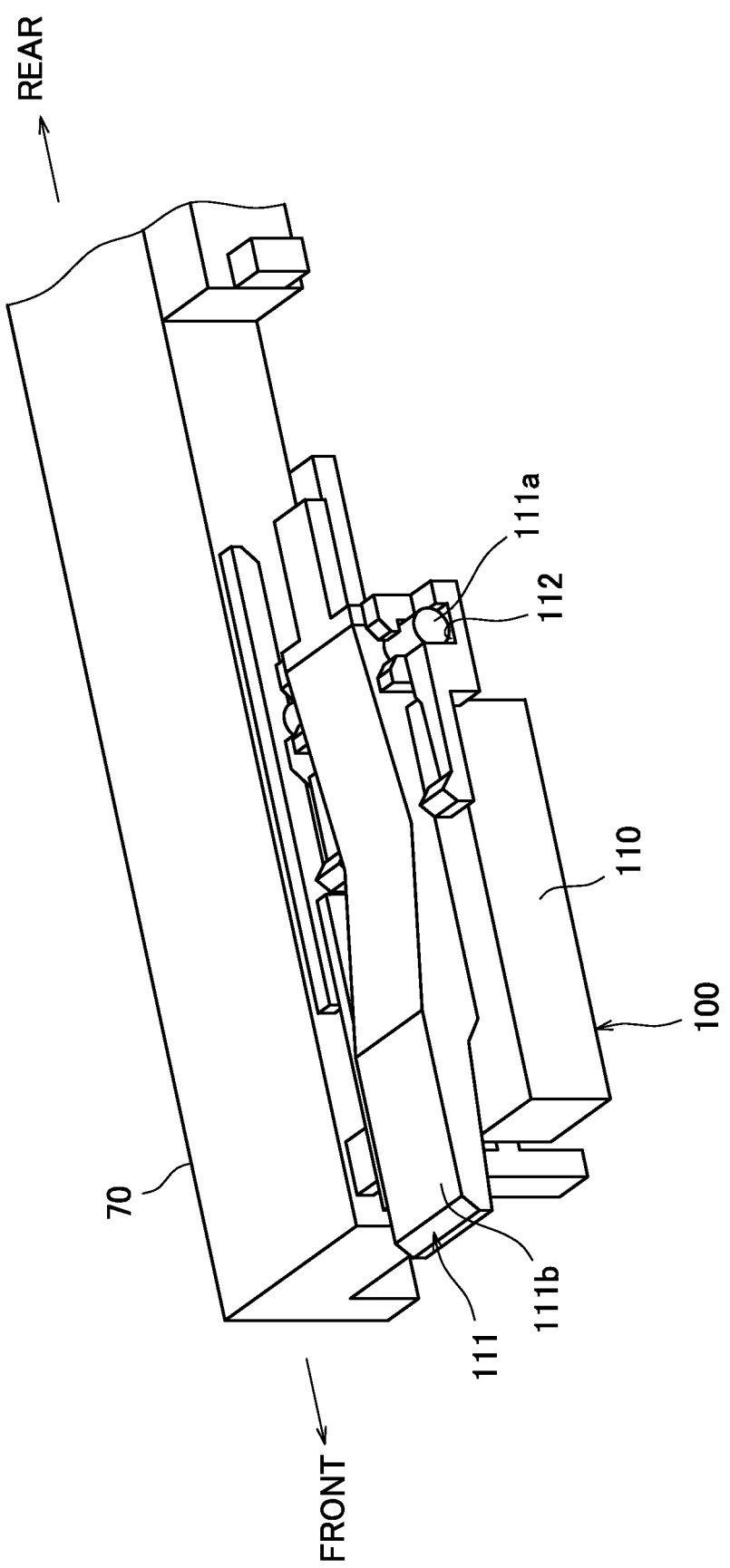
FIG. 9A is a perspective view showing a structure of a detection unit in a case where an article is small.

Furthermore, as shown in FIGS. 9(A) and (B), the support member 110 is movable in the front-rear direction to the support member 70, and, for example, claw portions provided on the support member 110 fit in a plurality of recesses provided in the support member 70. Thus, the support member 110 is configured to be fixable to the support member 70 every position of 10 mm to 20 mm.

As described above, according to the present embodiment, in the dispensing mechanism 55 disposed in the shelf 13 of the article vending machine 1, the belt conveyor unit 57 that sequentially dispenses the carried articles forward includes two belt conveyors 71 arranged in the right-left direction, and hence, right and left lower portions of the article carried on the belt conveyors 71 are supported. The two belt conveyors 71 are driven, so that properties of dispensing the articles forward can improve.

Furthermore, since the two belt conveyors 71 are arranged away from each other in the right-left direction, the detection unit 100 and the spur gear 73*a* to drive the belt of the belt conveyor 71 can be disposed between the two belt conveyors 71. Therefore, associated components of the belt conveyor 71, such as the detection unit 100 and the spur gear 73*a*, can be arranged at the positions close to center of gravity of the article in the right-left direction. Functionalities of associated components such as the detection unit 100 and the spur gear 73*a* can improve, and the belt conveyor unit 57 and the dispensing mechanism 55 including the associated components can be compactly formed.

Furthermore, the belt conveyor unit 57 is configured to be removably attached to the shelf 13, and a spiral conveyor unit may be attached in place of the belt conveyor unit 57 as required. The spiral conveyor unit includes a spiral part including a spirally formed metal rod having a diameter of several millimeters, and a pedestal extending in a front-rear direction below the spiral part and in parallel with an axis of the spiral part, to support a component installed in a pitch between the spiral parts. The spiral part has a rear end removably attached to the connecting section 67*a* of the front surface of the gear 67. Therefore, the drive section 60 can be for use in common, and the belt conveyor unit 57 can be easily replaced with the spiral conveyor unit as required.

Note that the present invention is not limited to the above embodiment. For example, a detailed structure of the gear section 69 of the belt conveyor unit 57 may be suitably changed. A plurality of detection levers 111 having different lengths in the front-rear direction of the detection unit 100 may be prepared, and the detection lever may be suitably replaced in accordance with a size of the article. Consequently, a position of a tip of the detecting portion 111*b* of the detection lever 111 in the front-rear direction can be changed.

Furthermore, in the above embodiment, the connecting section 67*a* on the front surface of the gear 67 disposed on the gear shaft 63 is connected to the connecting section 75*b* at the rear end of the first gear shaft 75. Alternatively, when the gear 67 can be removed from the gear shaft 63, the gear shaft 63 may be directly connected to the first gear shaft 75.

Additionally, in the above embodiment, two belt conveyors 71 have the same width, and may have different widths.

Furthermore, in the above embodiment, the belt conveyor unit 57 includes two belt conveyors 71.

Alternatively, the present invention can be applied to a belt conveyor unit including a plurality of belt conveyors 71. For example, in a belt conveyor unit including an even number of, for example, four belt conveyors 71, a space is made between two belt conveyors 71 and two belt conveyors 71, and in this space, the spur gear 73*a* or the detection lever 111 may be disposed in a center of the belt conveyor unit in the right-left direction.

However, in the belt conveyor unit including two or more, for example, four belt conveyors 71, tension may vary in accordance with accuracy in length of the belt, and the belt may slip. Therefore, the belt conveyor unit 57 including two belt conveyors 71 as in the above embodiment preferably has better balance in operation than the belt conveyor unit including more than two belt conveyors 71.

Furthermore, a detailed structure of the detection unit 100 in the above embodiment may be suitably changed, The present invention can be broadly adopted in an article vending machine in which articles arranged in a row and stored in a shelf are sequentially moved by a dispensing mechanism and dispensed one by one from the shelf.

EXPLANATION OF REFERENCE SIGNS

1 article vending machine
13 shelf
55 dispensing mechanism
57 belt conveyor unit (a dispensing unit)
60 drive section
61 motor
63 gear shaft (a rotary drive shaft)
67*a* connecting section
71 belt conveyor
73 rear rotary shaft (a belt drive shaft)
73*a* spur gear (a gear)
75 first gear shaft (a rotary drive shaft)
75*a* first bevel gear
75*b* connecting section
75*c* recess
76 second gear shaft (an intermediate shaft)
76*a* second bevel gear
76*b* spur gear (an intermediate shaft gear)
100 detection unit (a detecting section)

The invention claimed is:

1. A dispensing mechanism for an article vending machine, comprising a drive section that is disposed in an article storing shelf and on which articles arranged in a front-rear direction are carried, the drive section being configured to drive based on a vending command, and a dispensing unit that is driven by the drive section to sequentially dispense the articles forward, wherein the dispensing unit comprises a plurality of belt conveyors arranged in a right-left direction, arranged away from each other in the right-left direction in at least a portion, and each having an upper surface moved forward to discharge the article carried on the upper surface forward, wherein the drive section comprises a motor disposed in a rear part of the shelf, to drive, via a gear, a belt drive shaft over which belts of the belt conveyors are looped, and the gear is disposed in a center between an even number of belt conveyors arranged in the right-left direction.

2. The dispensing mechanism for the article vending machine according to claim 1, wherein a rotary drive shaft to be driven and rotated by the motor and the belt drive shaft are arranged orthogonally to each other, the rotary drive shaft is provided with a first bevel gear including a recess in a central portion, the dispensing mechanism comprising an intermediate shaft disposed in parallel with the belt drive shaft, and including a second bevel gear that meshes with the first bevel gear, and an intermediate shaft gear that meshes with the gear disposed on the belt drive shaft, at least a part of the intermediate shaft gear being located in the recess of the first bevel gear.

3. The dispensing mechanism for the article vending machine according to claim 1, comprising a detecting section that detects presence/absence of the article carried on the belt conveyor, between the belt conveyors in the right-left direction.

4. The dispensing mechanism for the article vending machine according to claim 2, comprising a detecting section that detects presence/absence of the article carried on the belt conveyor, between the belt conveyors in the right-left direction.

5. The dispensing mechanism for the article vending machine according to claim 3, wherein the detecting section is disposed in a center between an even number of belt conveyors arranged in the right-left direction.

6. The dispensing mechanism for the article vending machine according to claim 4, wherein the detecting section is disposed in a center between an even number of belt conveyors arranged in the right-left direction.

7. The dispensing mechanism for the article vending machine according to claim 2, wherein the dispensing unit is removably fixed to the shelf, and comprises a connecting section removably disposed between a region of the rotary drive shaft that is supported in the shelf and the first bevel gear.

* * * * *